United States Patent [19]

Takagi et al.

[11] Patent Number: 5,031,220
[45] Date of Patent: Jul. 9, 1991

[54] MOBILE STEREO SPEAKER SET

[75] Inventors: Kazunori Takagi; Masahiko Ito, both of Kawagoe, Japan

[73] Assignee: Pioneer Electronic Corporation, Tokyo, Japan

[21] Appl. No.: 411,975

[22] Filed: Sep. 25, 1989

[30] Foreign Application Priority Data

Jan. 17, 1989 [JP] Japan ................................. 1-4069[U]

[51] Int. Cl.$^5$ ............................................. H04B 1/00
[52] U.S. Cl. ..................................... 381/86; 381/160; 381/188; 381/205; 181/155
[58] Field of Search ................. 381/205, 188, 24, 86, 381/160; 181/154, 155

[56] References Cited

U.S. PATENT DOCUMENTS

| | | |
|---|---|---|
| 4,348,750 | 9/1982 | Schwind ............................ 181/155 |
| 4,594,729 | 6/1986 | Weingartner ........................ 381/24 |
| 4,620,317 | 10/1986 | Anderson ............................ 181/155 |
| 4,625,829 | 12/1986 | Sirols ................................ 181/155 |
| 4,769,843 | 9/1988 | Imai et al. ............................ 381/86 |
| 4,836,329 | 6/1989 | Klayman ............................ 181/155 |

Primary Examiner—Forester W. Isen
Attorney, Agent, or Firm—Sughrue, Mion, Zinn, Macpeak & Seas

[57] ABSTRACT

A mobile stereo speaker unit and assembly includes a central speaker for reproducing both left and right stereo sound channels. The central speaker is in a well in the central portion of the front panel of a vehicle, and a reflector is positioned above the speaker to intercept the sound and reflect it in a desired direction. The direction is selectable vertically or horizontally depending on the particular reflector used and the reflected sound may be directed towards the rear or towards the front windshield.

10 Claims, 6 Drawing Sheets

MOBILE STEREO SPEAKER SET

BACKGROUND OF THE INVENTION

The present invention relates to a mobile stereo speaker set, and particularly relates to a mobile stereo speaker set which is embedded in a padded interior-panel of a vehicle.

Most conventional mobile acoustic reproducing devices have speakers corresponding to left and right audio channels attached to a rear parcel tray or left and right end portions of an interior-panel so as to provide an acoustic field.

However, in view of the configuration of the vehicle in which the speakers are placed, particularly a passenger car, a passenger in the front or rear seat will not be sitting in a central position with respect to the speakers, but will be sitting nearer the left or right speaker. As a result, the passenger does not get a true stereo acoustic feel.

In order to solve the above problem, it has heretofore been proposed to provide two pairs of left and right channel speakers Lsp and Rsp, as shown in FIG. 11. The speakers Lsp and Rsp correspond to sitting positions Ls and Rs and are mounted on a rear parcel tray 1 positioned at the rear of a rear seat so that each passenger can listen to acoustic images of the left and right channels equally. Another proposed solution, shown in FIG. 12, is to provide two speakers Rsp and Lsp on opposite sides of a rear parcel tray 1 and a composite speaker Lsp+Rsp positioned near a central position of a rear parcel tray 1.

In such a mobile acoustic apparatus as described above, the number of speaker units to be mounted is increased, the cost of equipment becomes high, and acoustic images emanate unnaturally from behind the passenger. Though it is ideal to mount speaker units of left and right channels in front of a front seat, that is, on an interior-panel portion, it is difficult to realize this ideal state in the conventional speaker mounting system utilizing a rear parcel tray.

SUMMARY OF THE INVENTION

It is therefore an object of the present invention to provide a mobile stereo speaker set in which an improvement is made to a speaker unit to be attached, in an embedded fashion, in a central position of an interior-panel pad portion, in order to provide an auditory localization with an unbounded stereo sense to a passenger in a front seat.

In order to attain the foregoing object, according to the first aspect of the present invention, the mobile stereo speaker set to be attached in the embedded fashion to an interior-panel pad portion is characterized by: left and right channel speaker units; a further speaker unit disposed between the left and right channel speaker units and reproducing the left and right channels; and a reflector provided in front of the further speaker unit and having a selectable reflection angle or direction. According to the second aspect of the invention, the reflector is provided with a partition wall formed at a center portion thereof, and openings are formed in the left and right of the partition wall for radiating a reproduced sound. According to the second aspect of the invention, the reflector is attached in front of the speaker unit so as to be rotatable about a center line of the speaker unit.

In the first aspect, an acoustic wave radiated from a diaphragm is reflected at a desired angle so that it is possible to provide an optimum auditory localization to a passenger, and in the second aspect, the reflection direction of the reflector is selected so that it is possible to give an optimum acoustic image to a passenger, and in the third aspect, it is possible to select the radiation direction of a reproduced sound within a range along a horizontal plane.

DETAILED DESCRIPTION OF THE PREFERRED EMBODIMENTS

Figure 1:
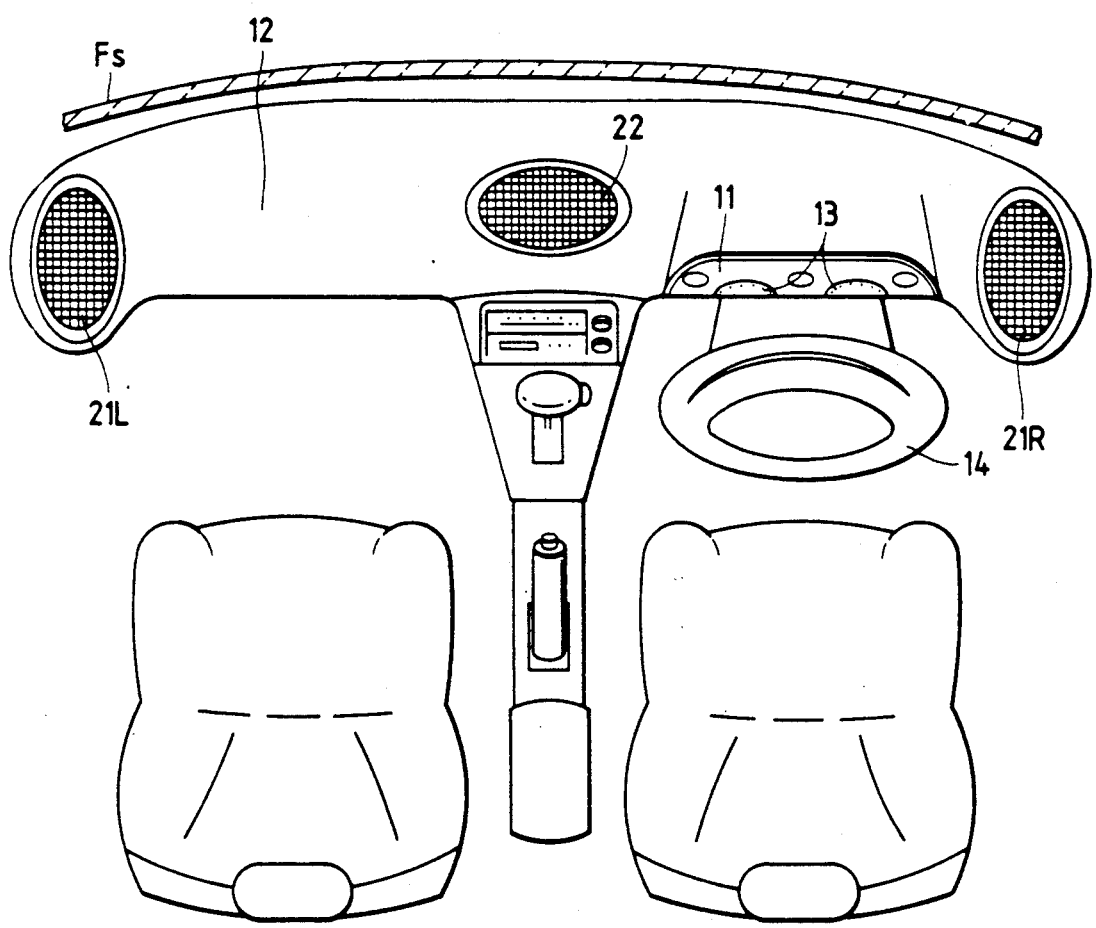
FIG. 1 is a schematic diagram illustrating a vehicle interior to which the present invention is applied.
Figure 2:
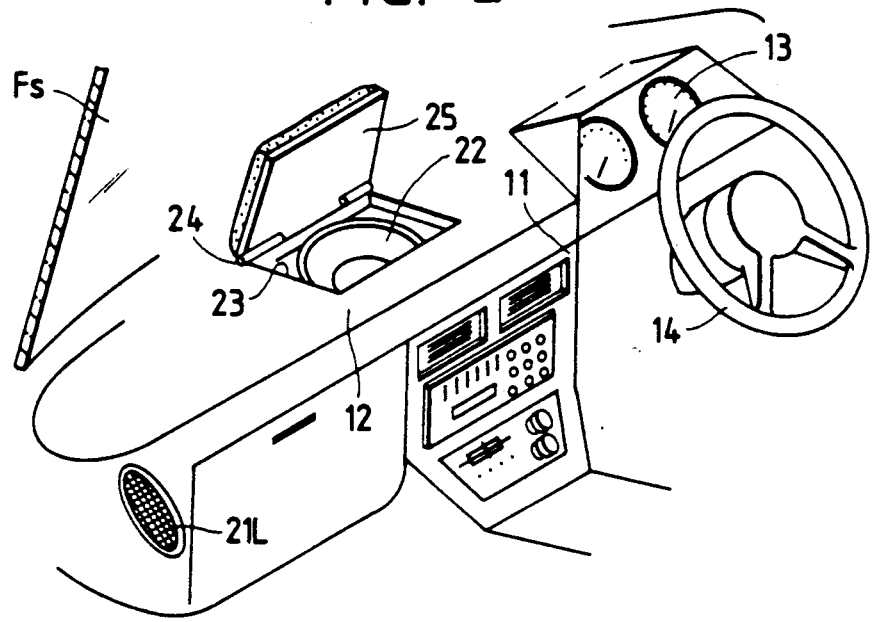
FIG. 2 is a perspective view of a first embodiment of the invention.
Figure 3:
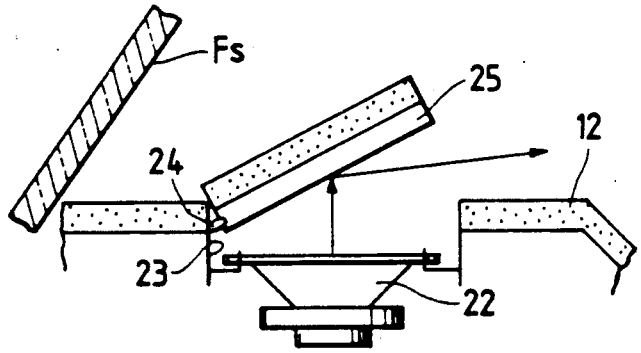
FIG. 3 is a diagram for explaining the operation of the reflector of FIG. 2.

An embodiment of the present invention will be described with reference to FIGS. 1-3 of the accompanying drawings. In FIGS. 1-3, the reference numeral 11 represents an interior-panel portion provided in a front portion of a vehicle, 12 an interior-panel pad portion, 13 various instruments mounted on the interior-panel portion 11, and 14 a steering wheel.

Left and right channel speakers 21L and 21R are attached to the left and right end portions of the interior-panel portion 11, respectively, and a speaker unit 22 for reproducing a left channel for a driver and a right channel for a navigator is embedded in the interior-panel pad portion 12.

As shown in FIGS. 2 and 3, in front of the speaker unit 22 a reflector 25 is pivotally attached through a pivot 24 to a forward edge of a space 23 accommodating the speaker unit 22. The reflector 25 can be kept in a desired position by the friction between the pivot 24 and the reflector 25, and the open portion of the accommodation space 23 can be closed when the reflector 25 is turned down.

Figure 4:
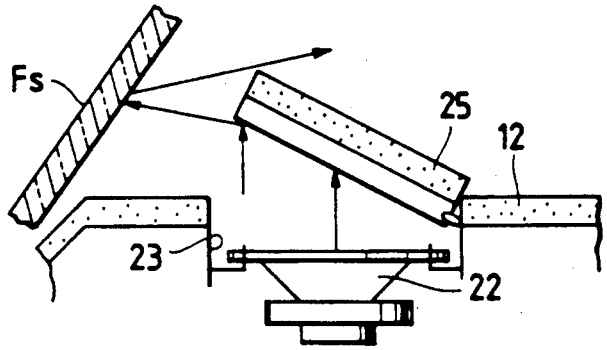
FIG. 4 illustrates a modification of FIG. 3.

According to a variation shown in FIG. 4, it is possible to make the reflector 25 open towards the front windshield Fs by positioning the pivot 24 at a rear edge of the opening 23.

Figure 5:
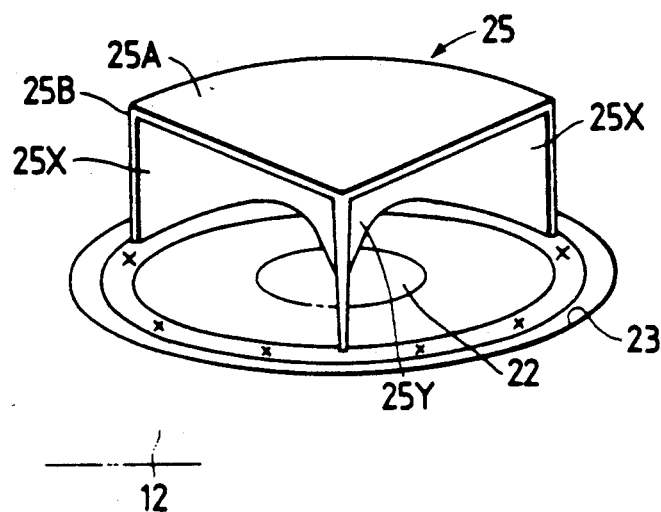
FIG. 5 is a perspective view of a second embodiment of the invention.
Figure 6:
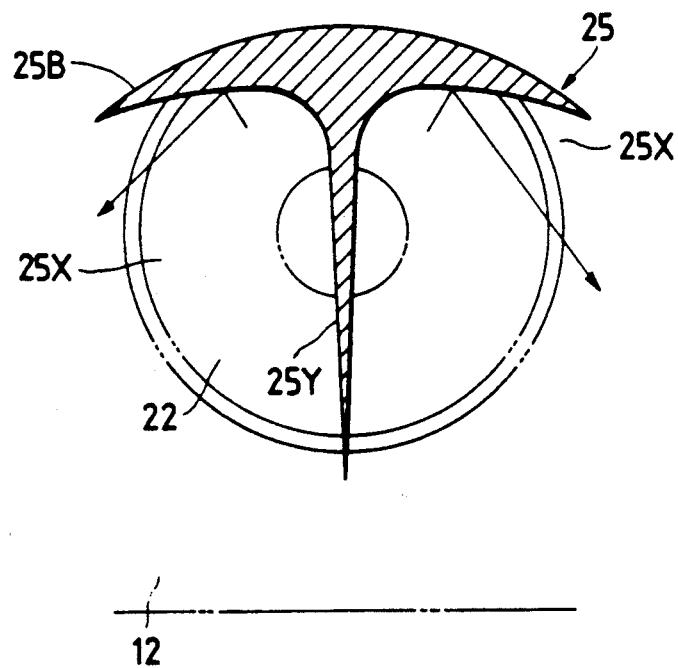
FIGS. 6 and 7 are diagrams illustrating the operation of the reflector of FIG. 5.
Figure 7:
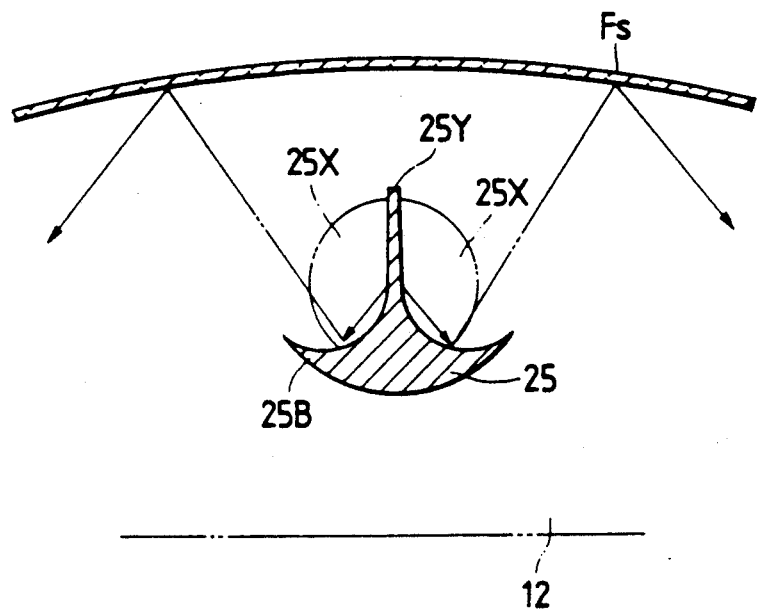

As shown in FIGS. 5-7, the reflector 25 may be configured to provide a plate 25A and a circumferential plate 25B covering an opening portion of an accommodation space 23 so as to provide openings 25X which face the front seat of the vehicle, and a partition wall 25Y separating the openings 25X into the left and right portions. FIGS. 6 and 7 illustrate a cross-sectional view of reflector 25 taken along a plane below and parallel to top surface 25A.

Figure 8:
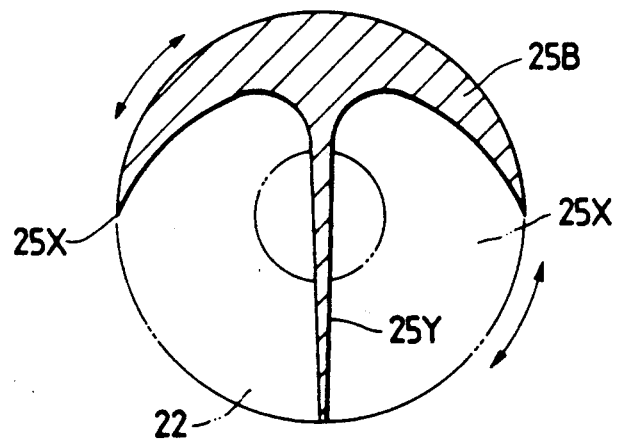
FIG. 8 is a plan view of a rotatable reflector used in the present invention.

Moreover, as indicated by the arrows in FIG. 8, the reflector 25 constituted by the plate 25A, the circumferential plate 25B and the partition wall 25Y may be made rotatable along the edge of the accommodation space 23 so that the direction of radiation of the reproduced sound can be selected.

Figure 9:
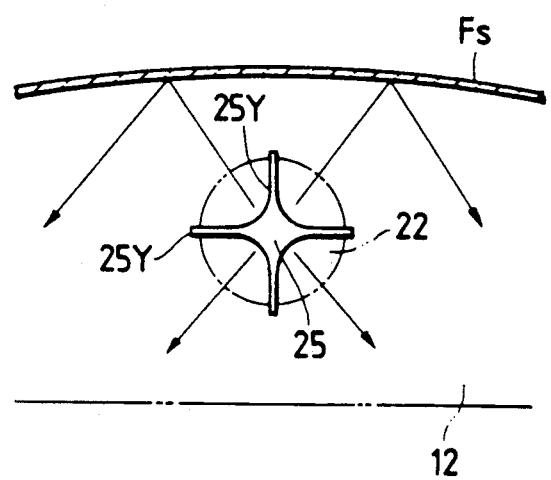
FIG. 9 illustrates another embodiment of the invention.

Further, in order to divide the opening portion of the accommodation space 23 into four openings, the reflector 25 may be arranged symmetrically as shown in FIG. 9, so that a part of the reproduced sound is partly reflected off the front windshield Fs and the rest thereof is radiated directly to the listeners, whereby an acoustic image is formed as a virtual image over the front windshield Fs to thereby make it possible to enjoy a very deep acoustic image.

Figure 10:
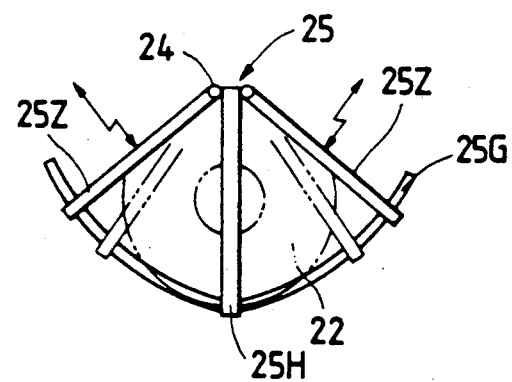
FIG. 10 illustrates another embodiment of the invention.
Figure 11:
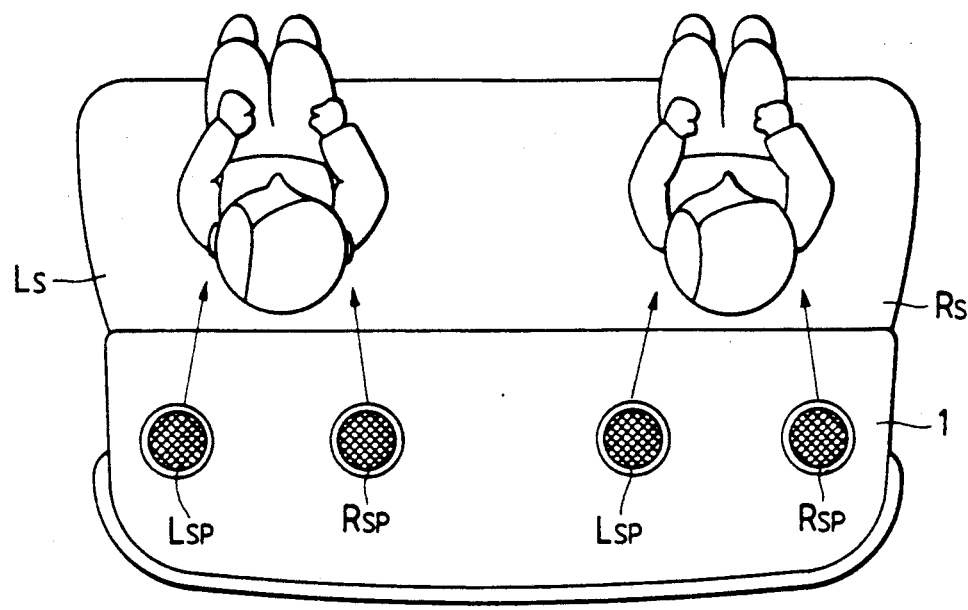
FIGS. 11 and 12 are diagrams for explaining conventional mobile speaker arrangements.
Figure 12:
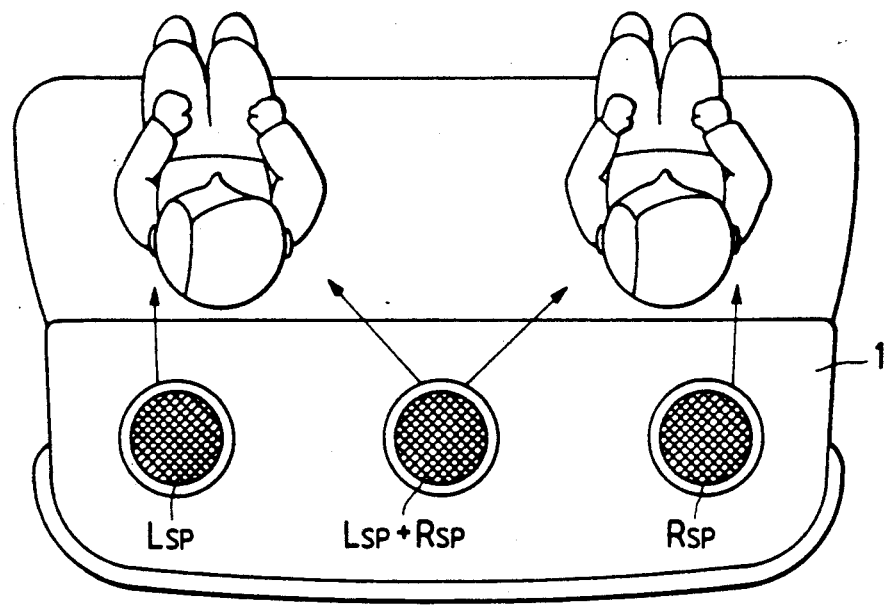

In FIG. 10, a partition wall 25H may be positioned above the speaker unit 22 so that reproduced sound emitted from the speaker unit 22 will be separated into the left and right positions. Movable reflectors 25Z may be pivotally attached through pivots 24 to the opposite sides of the front edge of the partition wall 25H. The movable reflectors 25Z may be made rotatable along guide grooves 25G so that the reproduced sound can be selectively expanded.

Each reflector 25 having been described above, can supply a reproduced sound emitted from the speaker unit 22, to listeners in a front seat, directly, and/or through reflection of the sound off the front windshield Fs.

As is apparent from the above description, according to a first aspect of the present invention, the direction of reflection of an acoustic wave can be varied in the vertical direction by adjusting a reflector lid about a pivot, so that it is possible to provide stereo reproduction by effective use of an acoustic field depending on the relationship with a vehicle.

According to a second aspect of the present invention, the reflection angle and direction of the reproduced sound can be varied in the horizontal direction, so that it is possible to enjoy a stereo reproduced sound according to the position of passengers. According to a third aspect of the present invention, a part of a reproduced sound can be reflected off the front windshield, so that it is possible to listen to a reproduced sound reflected on a reflector and the front windshield, as well as a reproduced sound reflected only on the reflector.

Also, according to each aspect of the present invention, it is possible to provide the same acoustic sound image to the left and right passengers in the front seat of the vehicle.

What is claimed:

1. A mobile speaker set for use in a vehicle having a front panel, comprising left and right speakers adapted to be embedded in a front panel of a vehicle on the left and right sides respectively, a central speaker adapted for carrying left and right channel stereo signals and to be embedded in an opening in a central location of the front panel, and a reflector provided in the sound emanating path of said central speaker for selectively directing the further sound path of said sound after reflection therefrom, wherein said reflector has a top planar plate positioned above said central speaker, a semi-cylindrical portion extending from said opening above said central speaker to said planar plate, and a vertical separator panel dividing said reflector into at least two portions, each portion reflecting the sound from said central speaker horizontally but at diverse angles within said vehicle.

2. The invention of claim 1, wherein said reflector is positioned to reflect said sound rearwardly in said vehicle.

3. The invention of claim 1, wherein said reflector is positioned to reflect said sound frontwardly in said vehicle to further reflect off a front windshield of the vehicle.

4. The invention of claim 1, wherein said reflector is horizontally rotatable about a vertical axis running through the center line of said central speaker.

5. A mobile stereo speaker assembly for a vehicle having a front panel and a front windshield; said speaker assembly comprising,
a central speaker connected for producing sound of left and right stereo channels, said speaker being positioned facing upwards within a well in said front panel; and
an adjustable sound reflector positioned on said panel above said speaker and being adjustable to selectively direct reflected sound therefrom which emanates from said speaker, wherein said reflector has a top planar plate positioned above said central speaker, a semi-cylindrical portion extending from said well above said central speaker to said planar plate, and a vertical separator panel dividing said reflector into at least two portions, each portion reflecting the sound from said central speaker horizontally but at diverse angles within said vehicle.

6. The invention of claim 5, wherein said reflector is positioned to reflect said sound rearwardly in said vehicle.

7. The invention of claim 5, wherein said reflector is positioned to reflect said sound frontwardly in said vehicle to further reflect off said front windshield of the vehicle.

8. The invention of claim 5, wherein said reflector is horizontally rotatable about a vertical axis running through the center line of said central speaker.

9. A mobile speaker set for use in a vehicle having a front panel, comprising left and right speakers adapted to be embedded in a front panel of a vehicle on the left and right sides respectively, a central speaker adapted for carrying left and right channel stereo signals and to be embedded in an opening in a central location of the front panel, and a reflector provided in the sound emanating path of said central speaker for selectively directing the further sound path of said sound after reflection therefrom, wherein said reflector is a planar reflector hinged to a rear edge of said opening and pivotable about said hinge to control the vertical direction of said sound path and to direct said sound toward a front windshield of the vehicle.

10. A mobile stereo speaker assembly for a vehicle having a front panel and a front windshield; said speaker assembly comprising,
a central speaker connected for producing sound of left and right stereo channels, said speaker being positioned facing upwards within a well in said front panel; and
an adjustable sound reflector positioned on said panel above said speaker and being adjustable to selectively direct reflected sound therefrom which emanates from said speaker, wherein said reflector is a planar reflector hinged to a rear edge of said well and pivotable about said hinge to control the vertical direction of said sound path and to direct said sound toward said front windshield of the vehicle.

* * * * *